United States Patent
Robles Gil Daellenbach et al.

(10) Patent No.: US 8,595,312 B2
(45) Date of Patent: Nov. 26, 2013

(54) MASTER DEVICE DETECTING OR HOST COMPUTER DETECTING NEW DEVICE ATTEMPTING TO CONNECT TO CONTROLLER AREA NETWORK (CAN)

(75) Inventors: Francisco Xavier Robles Gil Daellenbach, Tecamachalco Edo (MX); Gabriel Camporredondo Diaz, Tlalnepantla Edo (MX)

(73) Assignee: Microsafe SA DE CV, Tlanepantla (MX)

( * ) Notice: Subject to any disclaimer, the term of this patent is extended or adjusted under 35 U.S.C. 154(b) by 174 days.

(21) Appl. No.: 13/174,353

(22) Filed: Jun. 30, 2011

(65) Prior Publication Data

US 2012/0005297 A1    Jan. 5, 2012

Related U.S. Application Data

(60) Provisional application No. 61/360,091, filed on Jun. 30, 2010.

(51) Int. Cl.
*G06F 15/16*    (2006.01)
*G06F 15/173*    (2006.01)

(52) U.S. Cl.
USPC ........................................ 709/208; 709/224

(58) Field of Classification Search
USPC ................... 709/208–211, 223–226
See application file for complete search history.

(56) References Cited

U.S. PATENT DOCUMENTS

| | | | |
|---|---|---|---|
| 3,653,480 A | | 4/1972 | Yamamoto et al. |
| 3,826,344 A * | | 7/1974 | Wahlberg ................... 194/206 |
| 4,359,631 A * | | 11/1982 | Lockwood et al. ........... 235/381 |
| 4,502,120 A * | | 2/1985 | Ohnishi et al. ................... 705/21 |
| 4,537,547 A * | | 8/1985 | Cole ................................. 414/5 |
| 4,669,596 A | | 6/1987 | Capers et al. |
| 4,877,950 A | | 10/1989 | Halpern |
| 5,450,938 A | | 9/1995 | Rademacher |
| 5,641,050 A | | 6/1997 | Smith et al. |
| 5,822,216 A | | 10/1998 | Satchell, Jr. et al. |
| 5,844,808 A * | | 12/1998 | Konsmo et al. ............... 700/244 |

(Continued)

FOREIGN PATENT DOCUMENTS

| | | |
|---|---|---|
| EP | 1 515 496 | 3/2005 |
| GB | 2186412 | 8/1987 |
| GB | 2435538 | 8/2007 |

OTHER PUBLICATIONS

Steve Corrigan, Controller Area Network Physical Layer Requirements, pp. 1-11 (Jan. 2008).*

(Continued)

*Primary Examiner* — Lance L Barry
(74) *Attorney, Agent, or Firm* — DLA Piper LLP US (57) ABSTRACT

A method and system for communicating; comprising: at least one master device comprising at least one master driver with at least one intelligent vending controller application; at least one slave device comprising at least one slave driver; and at least one controller area network (CAN) bus facilitating communication between the at least one master device and the at least one slave device; the master device facilitating communication between at least one host application and the at least one master device and the at least one slave device such that the slave device does not require the at least one intelligent vending controller application in order to communicate with the host application; wherein the at least one master device and the at least one slave device are vendor devices.

22 Claims, 6 Drawing Sheets

(56) References Cited

U.S. PATENT DOCUMENTS

| | | | |
|---|---|---|---|
| 5,870,698 A * | 2/1999 | Riedel et al. | 702/182 |
| 5,930,771 A * | 7/1999 | Stapp | 705/28 |
| 6,250,452 B1 | 6/2001 | Partyka et al. | |
| 6,390,269 B1 | 5/2002 | Billington et al. | |
| 7,925,791 B2 * | 4/2011 | Ellis et al. | 709/248 |
| 8,098,485 B2 * | 1/2012 | Weaver et al. | 361/679.01 |
| 2003/0168508 A1 | 9/2003 | Daellenbach et al. | |
| 2006/0054614 A1 | 3/2006 | Baxter et al. | |
| 2006/0106490 A1 | 5/2006 | Howell et al. | |
| 2010/0028501 A1 | 2/2010 | Baster et al. | |

OTHER PUBLICATIONS

International Search Report issued in International Application No. PCT/IB2011/002126, mailed Dec. 30, 2011.

Written Opinion issued in International Application No. PCT/IB2011/002126, mailed Dec. 30, 2011.

* cited by examiner

MASTER DEVICE DETECTING OR HOST COMPUTER DETECTING NEW DEVICE ATTEMPTING TO CONNECT TO CONTROLLER AREA NETWORK (CAN)

CROSS-REFERENCE TO RELATED APPLICATIONS

This application is based on and derives the benefit of the filing date of U.S. Provisional Patent Application No. 61/360,091, filed Jun. 30, 2010. The entire content of this application is herein incorporated by reference in its entirety.

DESCRIPTION OF EMBODIMENTS OF THE INVENTION

Intelligent Device System

Figure 1:
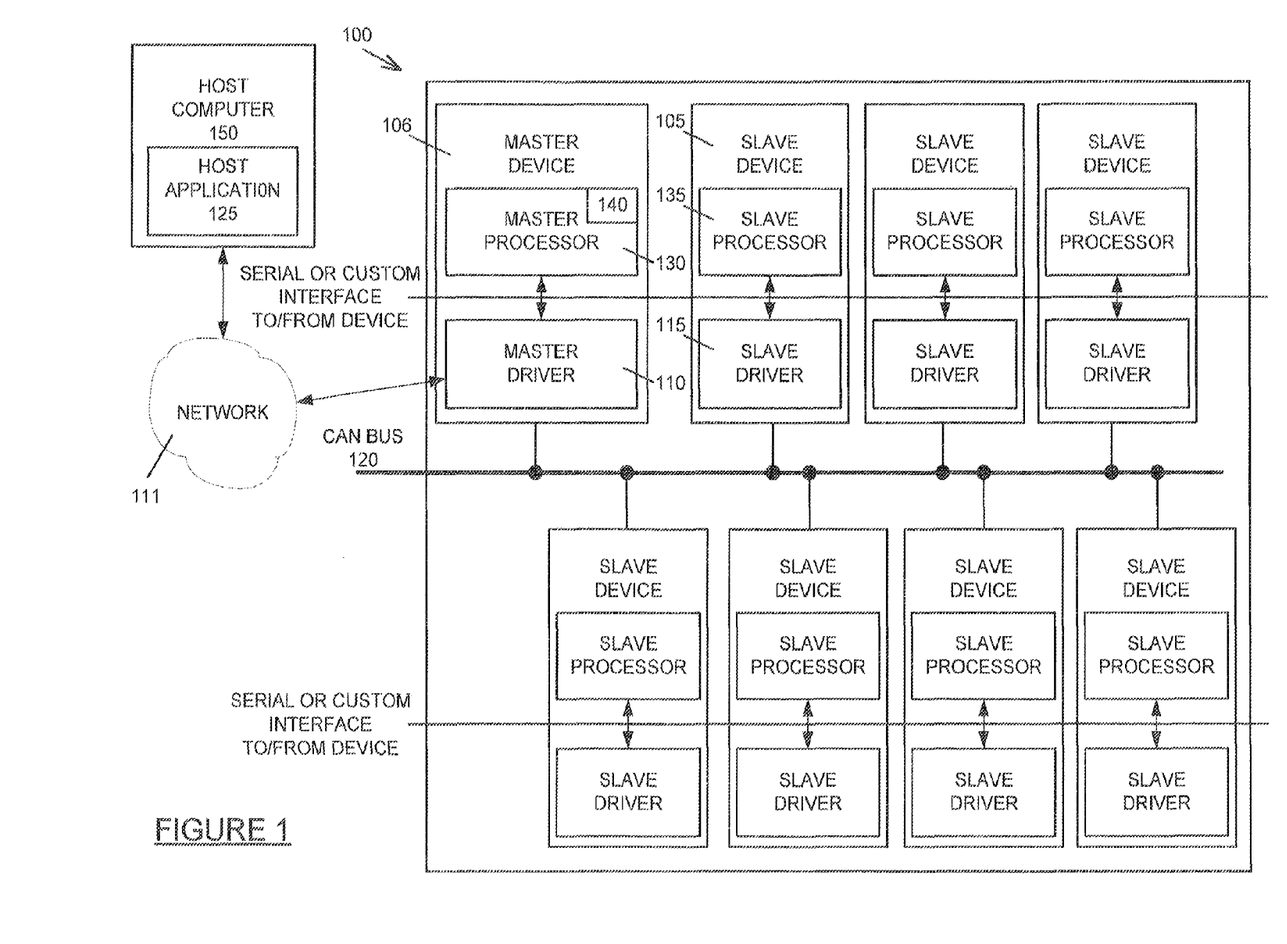
FIG. 1 illustrates a communications system, according to one embodiment.

FIG. 1 illustrates a communications system 100, according to one embodiment. Multiple devices (105, 106) can be connected, for example, by a bus, such as, but not limited to, a controller area network (CAN) bus 120. The devices may comprise a central processing unit (CPU) or multiple central processing units (CPUs).

The system 100 can comprise: at least one master device 106 comprising at least one master processor 130 and at least one master driver 110; at least one slave device 105 comprising at least one slave processor 135 and at least one slave driver 115; and at least one controller area network (CAN) bus 120 facilitating communication between the at least one master device 106 and the at least one slave device 105. The CAN bus 120 can be a vehicle bus standard that can allow drivers (and thus devices) to communicate with each other and with at least one host computer 125 in a limited area without each driver needing to communicate separately with the host computer 125. A CAN message can be broadcast to the network so that each driver reads every message and determines whether or not the message is for it.

As illustrated in FIG. 1, a master/slave configuration can be used. This configuration can allow the master driver 110 to tell the slave drivers 115 when it can transfer data to the host application 125. A slave driver 115 can make a request to the master driver 110, which can check to see if it (the master driver 110) is currently communicating with the host application 125. If the master driver 110 is idle, the master driver 110 can tell the slave driver 115 to go ahead and send the communication, which the master driver 110 will then forward. If the master driver 110 is communicating with the host computer, the master driver 110 can tell the slave driver 115 to wait until the master driver 110 gives the slave driver 115 permission to send the communication, which the master driver 110 will then forward.

CAN. As indicated above, CAN is a controller-area network vehicle bus standard that can allow devices 105 and 106 connected by the CAN bus 120 to communicate with each other in a limited area. Each device in the CAN bus 120 can send and receive messages. Each device (e.g., 105, 106) can comprise at least one driver (e.g., 110, 115) and at least one processor (e.g., 130, 135). The driver can receive messages from the bus, and then communicate the messages to the processor. In addition, the driver can receive message from the processor, and communicate them to the CAN bus 120. The processor can decide what the messages mean and can also create messages to transmit.

A message can comprise an ID (e.g., the driver ID) and data, and can be transmitted serially onto the CAN bus 120, one bit after another. This message can be sensed by all devices attached to the CAN bus 120. If the CAN bus 120 is free, any device may begin to transmit. If two or more devices begin sending messages at the same time, one message can override another using various override algorithms, which will be known to those of ordinary skill in the art. More information on the CAN bus 120 can be found in ISO 11898-1 (2003), which is herein incorporated by reference.

Many drivers can be configured as either master drivers 110 or slave drivers 115. In this case, the CAN bus 120 has a special master connector. Only the driver attached to the master connector receives the signal to be the master driver 110. That driver can then configure itself as the master driver 110. Since the other drivers receive no signal, they can default to slave mode.

Within the CAN bus 120, a master device 106 can communicate with any slave device 105 that is located within approximately 1000 meters of the at least one master device 106. However, those of ordinary skill in the art will see that the area that can be covered can increase as the CAN technology becomes more advanced.

IVC Software. As illustrated in FIG. 1, the master driver 110 can communicate with at least one master processor 130, which can comprise at least one intelligent vending controller (IVC) software 140, which can communicate with at least one host application 125 on at least one host computer 150.

The master device 106 can facilitate communication between at least one host application 125 and the slave device 105 such that only the master device 106 needs to have the IVC software 140 allowing the master device 106 as well as the slave device 105 to communicate with the host application 125. In this way, system 100 can be less expensive because fewer software licenses/packages are required. In addition, when the software 140 needs to be updated, fixed, or changed, only the software 140 in the master processor 130 needs to be updated, fixed, or otherwise changed. Because software 140 is not needed in the slave drivers 115, there is no need to bother with updating, fixing, or otherwise changing software in the slave drivers 115 which enables the slave drivers 115 to communicate with the host application 125, as the slave driver 115 is impacted as if its software 140 was updated, fixed or otherwise changed. This can be helpful when software changes very quickly, need to be fixed often, or is expensive. In addition, system 100 can have a high level of security because the software 140 is only present behind a firewall in the master processor 130, and is not present at all in the slave devices 105. It should be noted that the slave devices 105 can have other software, however, and the slave devices are not required to have software 140 which communicates with the host application 125.

Figure 3:
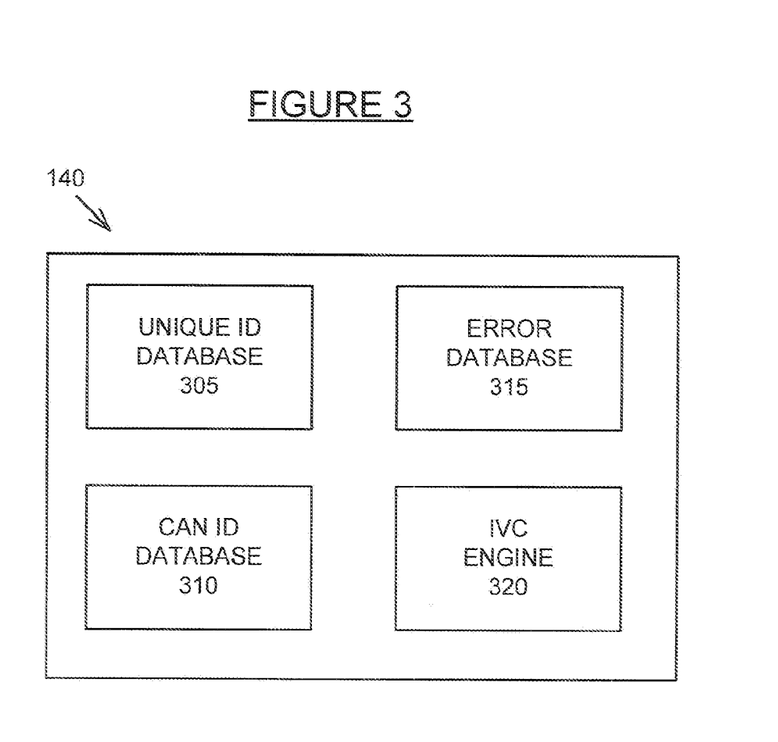
FIGS. 3-8 illustrates various details of the IVC software, according to several embodiments.

FIG. 3 sets forth details of the IVC software 140, according to one embodiment. The IVC software 140 can include, but is not limited to: at least one device unique ID database 305, at least one CAN ID database 310, at least one IVC engine 320, and at least one error log 315.

Figure 2:
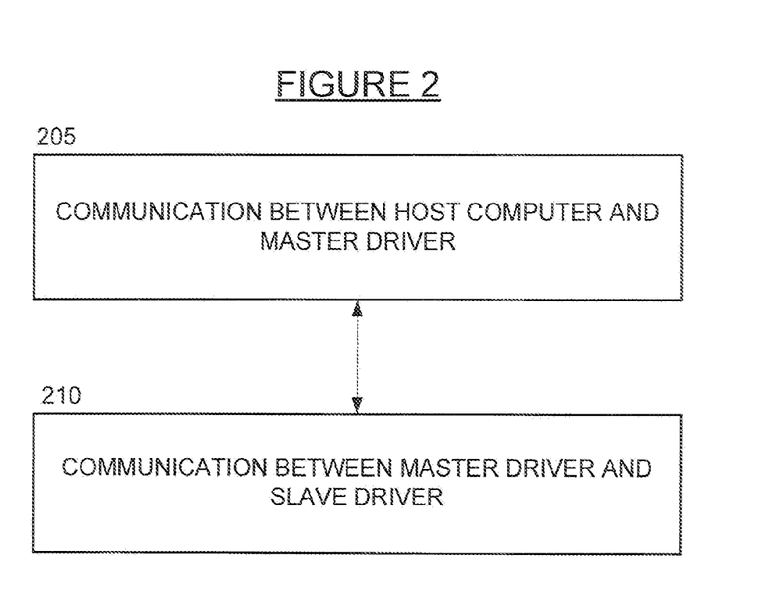
FIG. 2 illustrates a method for utilizing a communications system, according to one embodiment.

Device Unique ID Database. As illustrated in FIG. 2, the IVC software 140 can include a unique ID number database for any device connected to or part of master device 106 or slave device 105. The unique ID numbers can be, for example, serial numbers of the devices. A record can be kept of the different devices (e.g., keyboard devices, scanner devices, cash (e.g., bill, coin) validating and dispensing devices, etc.) that should be connected to or part of each master device 106 and slave device 105. This record can be kept at the IVC software 140 For example, a record can be kept of all devices that should be connected to the master device 106 and/or the slave device 105. The host application 125 can also keep a record of all devices that should be connected to the master devices 106 and/or host devices 105 as a back-up in some embodiments. (In some embodiment, this information can also be kept at the master driver 110 and/or the slave driver 115, and at a central maintenance and security host server.) In this way, the IVC software 140 can determine when an unauthorized device attempts to connect to the CAN bus 120. For example, if an unauthorized device (e.g., keyboard) attempts to connect to the master device 106 and/or slave devices 105 (e.g., in order to obtain PIN numbers from users), the IVC software 140 can be configured to shut down the master device 106 or slave device 105. In addition, in some embodiments, this information can help determine when any device or any part of device needs maintenance or replacement. For example, if the model information and dates are kept along with the serial numbers for each device (e.g., slave device 105, master device 106, as well as any devices connected to the slave device 105 and/or the master device 106, such as a keyboard) when the devices are older than a pre-set date, the master device 106 and/or slave device 105 can indicate that these devices need to be checked and/or replaced, and can communicate this information to the host application 125. (Note that in the case of a slave device 105 having connected devices that need to be replaced, the slave device 105 would first communicate to the master device 106, which would then communicate to the host application 125, as explained below.) In addition, if there is a problem with a particular device (e.g., a scanner of model X that has been recalled due to problems), the system 100 can indicate where these certain devices are located without the need to check each device.

CAN ID Database. The CAN ID database 310 can include information regarding the IDs of the various drivers connected to the CAN bus.

IVC Engine. The IVC engine 320 can receive and send messages to the host application 125. Details regarding the messages are discussed below with respect to FIG. 2.

Error Database. The error database 315 can record errors. The error database can have fields for the error code, subcode, date, time and severity level. When an error is recorded for a particular error code, any subsequent error with the same code can update the date and time for that code. Thus each error type can remain in the log until it is cleared. Additional information on example types of errors is described below with respect to FIG. 2.

Figure 4:
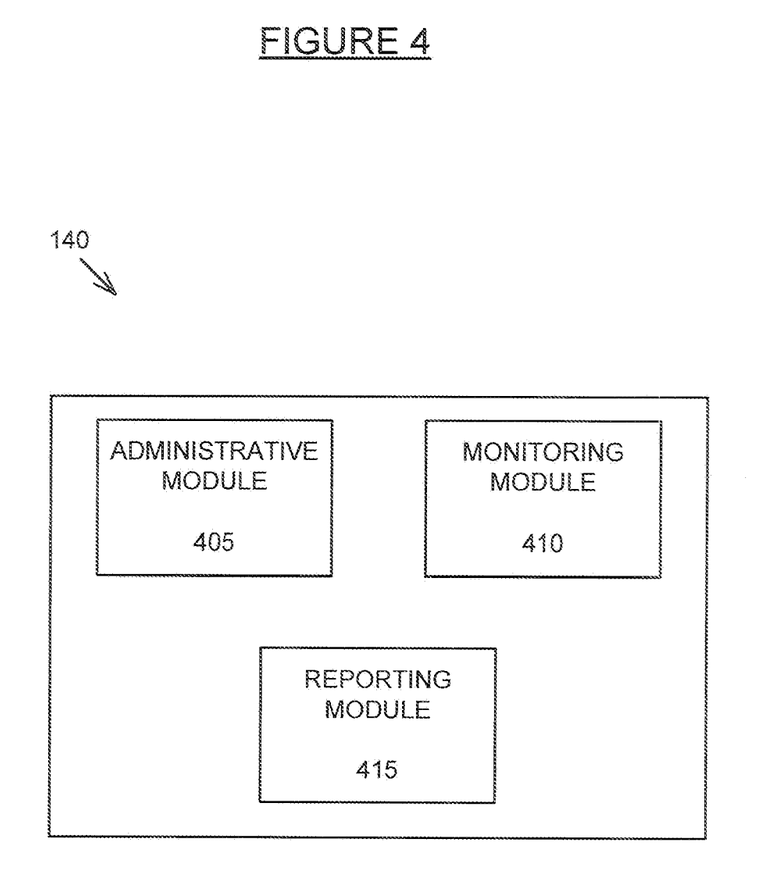

FIG. 4 illustrates another embodiment of IVC software 140, which can comprise an administration module 405, a monitoring module 410, or a reporting module 415, or any combination thereof. The administration module 405 can maintain information regarding users and device usage information. The monitoring module 410 can monitor various types of information related to the devices. The reporting module 415 can provide various reports related to the devices.

Figure 5:
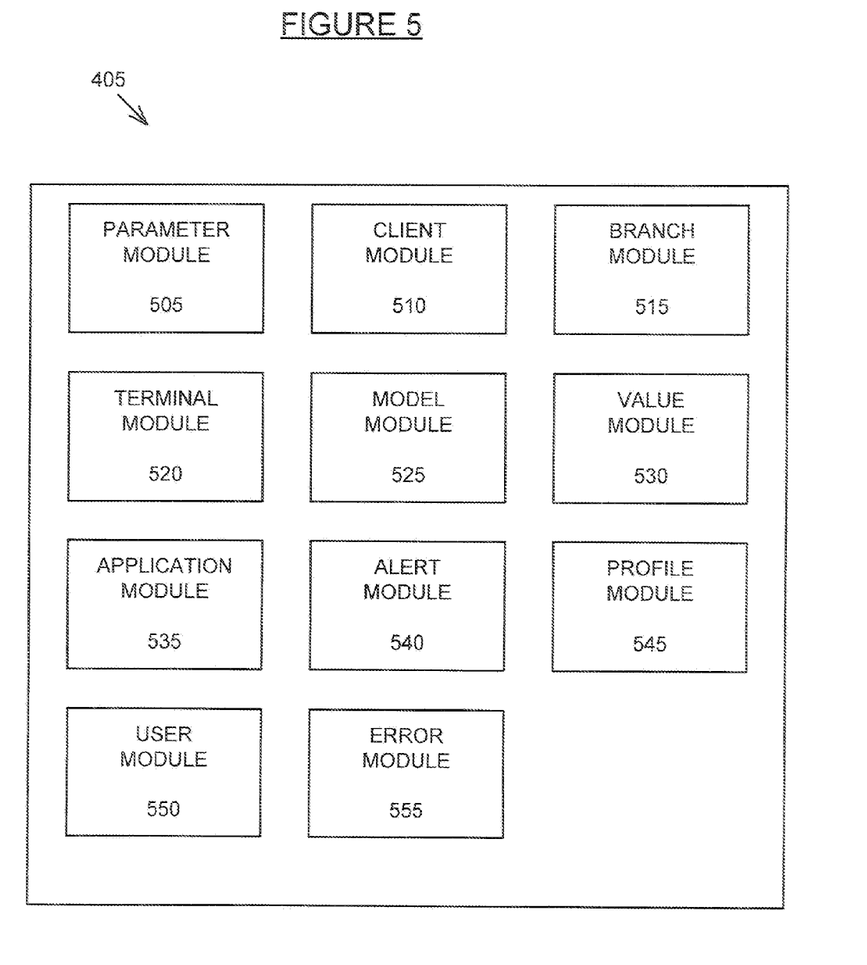

Administration Module. FIG. 5 illustrates details related to the administration module 405, according to an embodiment. The administration module 405 can include: parameter module 505, client module 510, branch module 515, terminal module 520, model module 525, value module 530, application module 535, alert module 540, profile module 545, user module 550, or error module 555, or any combination thereof. The parameter module 505 can manage various device parameters, such as, but not limited to: when the device is allowed to operate (e.g., 9 AM-6 PM), what kinds of bills and coins the device is allowed to accept and/or distribute, etc. The client module 510 can manage information related to clients (e.g., name, tax ID, phone numbers, fax numbers, etc.). The branch module 515 can manage information related to which client branches have devices installed. The terminal module 520 can manage information related to the devices (e.g., which client is using the device at which branch, the serial number of the device). The model module 520 can manage information related to which models of the devices are available. The value module 530 can manage information related to other entities, such as, but not limited to, a Cash in Transit company, which can pick up and drop off cash at the devices. The application module 535 can manage which applications a certain device utilizes. For example, a certain device may be configured to provide an ink stain feature, where bills can be stained by ink if the device is opened by someone without authorization. As another example, a certain device may be configured to keep track of how much cash is in the device at any given time. Many other types of applications related to the devices can be offered to the client. The alert module 540 can manage which alerts can be sent relating to the devices. For example, a certain device may keep track of how much cash is normally deposited every hour, and send an alert if cash is not deposited as expected. Many other types of alerts related to the devices may be offered to the client. The profile module 545 can manage various types of profiles. For example, profile A may be set up as allowing a user to enter cash into the device and also open the device; and profile B may be set up as allowing a user to only enter cash into the device. The user module 550 may manage information related to various users. For example, a user's name, user ID, password, contact information, profile information, etc. may be utilized. Thus, for example, a Cash in Transit employee's user ID and password may be stored, along with the user's profile, which indicates that this employee may open the device. The error module 555 can manage various errors. For example, errors can be shown to the users if they do something they should not do or that can't be done on the system.

Figure 6:
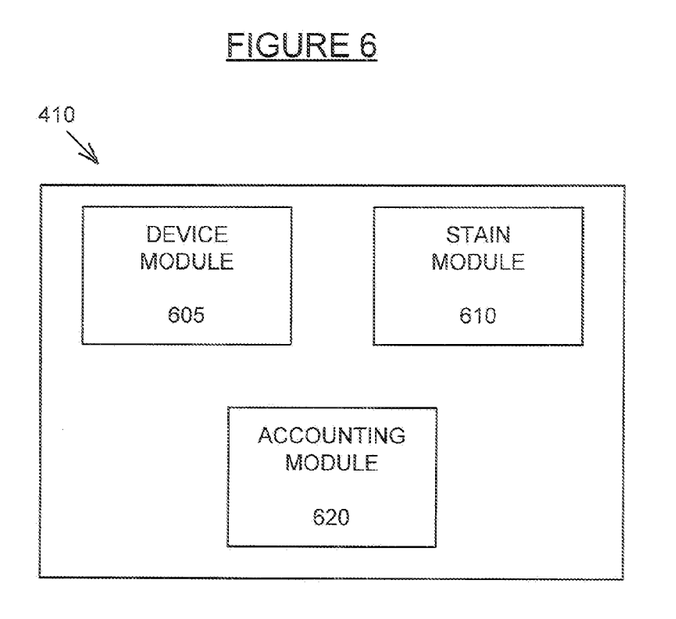

Monitoring Module. FIG. 6 illustrates details related to the monitoring module 410, which can include: a device module 605; an ink stain module 610; and an accounting module 620. The device module 605 may manage information related to the device, including, but not limited to: how much money is in the device, communications with the device, the monitoring of all alarms, and sending alarms when triggered. The ink stain module 725 may manage when the cash is stained with ink. For example, if certain conditions are met (e.g., an unauthorized user opens the device), the ink stain module 725 will cause ink to be distributed on the bills. The accounting module 620 can manage accounting information related to all of the devices, or all of a particular client's devices (e.g., how much money a client has in all of the client's different ATMs and PDTs at certain points in time).

Figure 8:
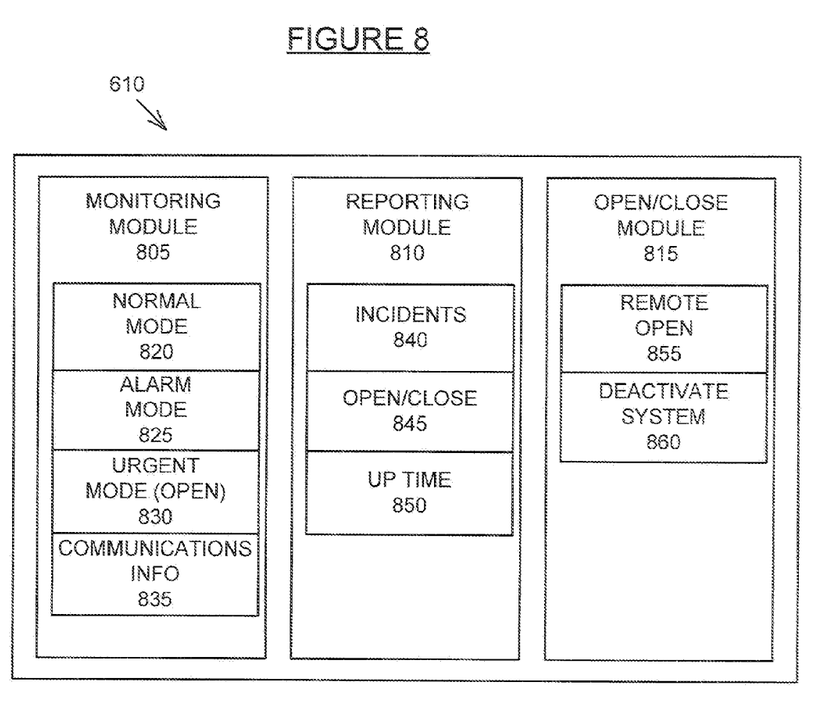

FIG. 8 provides details related to the ink stain module 610 of FIG. 6. The ink stain module 610 can comprise: a monitoring module 805, a reporting module 810, an open/close module 815; or any combination thereof. The monitoring module 805 can have various modes: normal mode 820; alarm mode 825 (e.g., when unauthorized activity detected), and urgent mode 830 (e.g., when a device is open and/or the initialization of the ink stain process). The communications module 835 can be used to monitor the communications between a host and a device to make sure the communications are working normally (e.g., there is no electricity lost, etc.).

The ink stain reporting module 810 can comprise: an incident module 840; an open/close module 845; or an up time module 850; or any combination thereof. The incident module can keep a log of all information related to all incidents. The reporting open/close module 845 can keep a log of whenever the device is open and/or closed. The up time module 850 can keep a log of how long the device was on and working. For example, the customer can see that the device was up and running when it should be (e.g., between 9 AM and 6 PM, five days a week 98% of the time).

The open/close module 815 can comprise: a remote open module 855 and/or a deactivate system module 860. The remote open module 855 can allow someone with authority to open the device from a remote location. The system deactivation module 860 can allow someone with authority to deactivate the device from a remote location.

Those of ordinary skill in the art will see that the modules can be moved around within the IVC software 140, and that alternate configurations are possible, such that some modules described herein as sub-modules of certain modules, can also be sub-modules of other modules within the IVC software 140.

Figure 7:
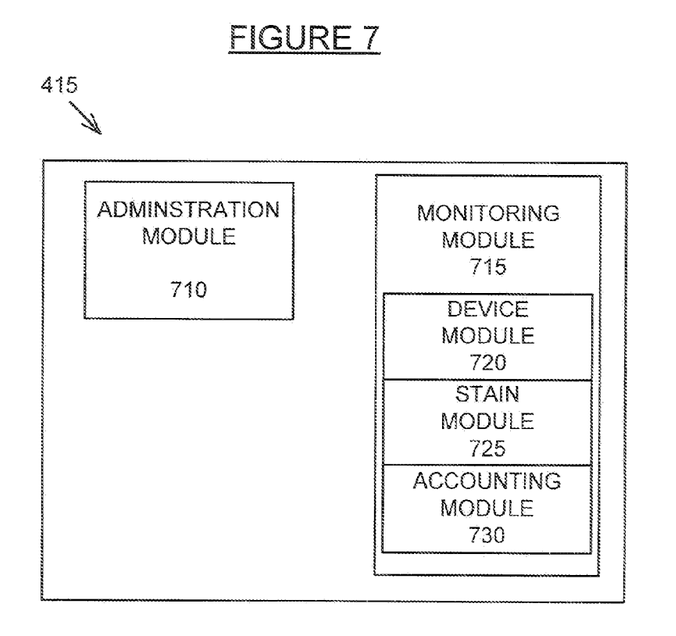

Reporting Module. FIG. 7 illustrates details related to the reporting module 415, which can include a reporting administration module 710 and/or a reporting monitoring module 715. The reporting administration module 710 can manage the various reporting capabilities related to the administration of the devices. The reporting monitoring module 715 can manage the reporting related to any monitoring of the devices, and can include: a device monitoring module 720, an monitoring ink stain module 725, or a reporting accounting module 730, or any combination thereof. The reporting device monitoring module 720 can create reports related to various abilities to monitor the devices. The reporting ink stain monitoring module 725 can create reports related to when ink staining is triggered. The reporting accounting module 730 can create reports related to how much money is at certain devices when.

Method for Using an Intelligent Device

FIG. 2 illustrates a method for communicating. In 205, information is communicated between the host application 125 and the master driver 110. For example, to send the master driver 110 an instruction, the host application 125 can assemble a message and send it to the master driver 110 as a sequence of characters on the communications link. In one example, the command can comprise the following fields: package length, message authentication signature, driver CAN ID, command code, data length, and data elements. The package length field can contain information on the total length in bytes for the command package. The message authentication signature field can be a byte sequence with a signature indicating that the host application 125 is allowed to access a device (e.g., a master device 106, a slave device 105). The command code field can indicate which commands should be performed. The data length field and data element field can have the data and the length of the data that is to be sent from the host application 125 to the master driver 110, and possibly to a slave driver 115.

In 210, information is communicated between the master driver 110 and the slave driver(s) 115. For example, to send the host application 125 a message, the master driver 110 can assemble a message and send it to the host application 125 as a sequence of characters on the communications link. In one example, the command can comprise the following fields: Package length, driver ID, response code, error code, data length, and data elements. The response code field can be a unique character code corresponding to the command to which it is a response. The error code field can be used to report errors detected during processing. The values can be numeric. A value (e.g., 00) can indicate that no errors were found. If an error value is returned (e.g., other than 00), subsequent fields may not be included in the message back to the host application 125.

Errors can include fatal errors, non-recoverable errors, recoverable errors, and programming errors. Fatal errors can indicate a hardware fault in the equipment, and can be logged and reported for user action to be taken (e.g., report to supervisor, maintenance requirements, security needs). Non-recoverable errors may not be rectified by the program and may need user intervention. Such errors can be logged and reported for user action to be taken (e.g., report to supervisor). Non-recoverable errors may prevent the master driver 110 from taking action on other types of commands. Recoverable errors may be the result of data corruption or may indicate that the master driver 110 cannot process a command because some other action is required first. The master driver 110 may attempt to recover by re-issuing the command, attempting to clear the corruption, or by implementing the missing action. Programming errors can be errors caused by programming.

The bi-directional arrow on FIG. 2 illustrates that the communicating can go in both directions, that is, from the host application 125 to the master driver 110 to the slave driver 115, and also from the slave driver 115 to the master driver 110 to the host application 125.

In some embodiments, the master device 106 and the slave device 105 can be devices. Such devices can include, but are not limited to: at least one ATM; at least one point of deposit terminal (PDT); at least one currency in/out handler; at least one cash dispenser (e.g., bill, coin); at least one recycler (e.g., bill recirculator); at least one sensor; at least one bill accepter; at least one printer; at least one scanner; at least one kiosk; at least one garage door opener; at least one cash register; at least one cash validator (e.g., bill, coin); at least one card reader; at least one card dispenser; at least one ticket dispenser (e.g., with or without embossing); at least one keyboard (e.g., standard keyboard, pad); at least one alarm device (e.g., fire alarm, safety alarm); at least one locking device; at least one power filter (e.g., surge protection system); or at least one vending machine; or any combination thereof. Any type of computer or processor can be included in any vendor device, or can be configured to work with any vendor device.

In some embodiments of the system 100, the master device 106 and the slave device 105 are similar devices (e.g., all are ATMs and/or PDTs). In other embodiments, the master device 106 and slave device 105 are different types of devices (e.g., different devices within an ATM, such as a bill recirculator and cash dispenser within an ATM; an ATM and cash machine; an ATM and garage door opener (e.g., for parking lot control, a point of deposit terminal (PDT) for monitored cash collection). Examples of such systems 100 are set forth below.

ATM Example

In one example, a banking entity can operate a host application 125, which can communicate with an ATM device. The ATM device can have a master driver 110 with software 140 to communicate with the host application 125. (It should be noted that throughout the examples listed here and below, in some embodiments, more than one master driver 110 may be utilized.) This master driver 110 can communicate over the CAN bus 120 with slave drivers 115 in the same ATM, the slave drivers 115 including, but not limited to: a bill dispenser, a bill acceptor, a bill recycler (e.g., bill recirculator), a coin dispenser, a coin acceptor, a coin recycler, sensors, a laser printer, a bar code reader, a check reader, a card dispenser, a card reader, a central control module for ink staining, or an electronic locking systems, or any combination thereof). Thus, for example, the host application 125 can communicate with the IVC software 140 such that the host application 125 is able to communicate with the bill dispenser and bill recirculator so that the same bills that are used by one client to make a deposit or pay a bill are given out to pay another client who is withdrawing money from the ATM.

Multiple ATM Example

In another example, a banking entity can operate a host application 125, which can communicate with one master ATM device (with a master driver 110). This master ATM device can in turn communicate over the CAN bus 120 with multiple slave devices (using slave drivers 115). When a user enters in a request for cash (e.g., bank card information, amount information, PIN information) in one of the slave ATM devices, the slave ATM device can indicate to the master ATM device that it wishes to communicate this information to the host application through the CAN bus 120. If the master ATM device is not already communicating with the host application 125, the master ATM device can indicate to the slave ATM device to forward the information, which the master ATM device can then forward to the banking entity's host application 125, which can determine that the bank card information matches the PIN information, and send instructions back to the slave ATM device, by way of the master ATM device, indicating that the amount of cash requested should be distributed and a receipt should be printed.

ATM/Cash Register Example

In one example, the master device 106 could be an ATM, and the slave devices 105 could be other ATMs as well as cash registers. The cash registers can be configured so that when a certain pre-set amount of cash has been input into a cash register, the cash register can indicate and/or require that a certain pre-set amount of cash be moved to an ATM. For example, if there are two ATMs and nine cash registers in a grocery store, one ATM can be the master devices 106 and one ATM and all of the cash registers can be the slave devices 105. It can be determined when a certain cash register has over $1000 in cash. For example, when cash is received, this can be electronically designated by a clerk or automatically designated before the cash is added to the cash register. This information can either be stored or computed (e.g., added) at the slave cash register, at the master ATM, or at the grocery store's host computer. Once the $1000 threshold has been met, the clerk can be instructed to give the cash to someone to deposit in one of the ATMs. (Note that the clerk can also have permission to do this.) In this example, the cash registers can be very secure because they do not have more than $1000 of cash at any one time. In addition, costs for running the ATMs can be reduced because the ATMs are continually replenished with cash from the cash registers. Thus, cash does not need to be delivered to the ATMs by cash in transit companies.

ATM/Garage Door Opener Example

In another example, an entity could operate a host application 125, which can communicate with one master ATM device. This master ATM device can in turn communicate over the CAN bus 120 with a slave garage door opener device. When a user enters in parking ticket information and cash or credit information in the slave garage door opener device, the slave garage door opener device can indicate to the master ATM device that it wishes to communicate this information to the host application through the CAN bus 120. If the master ATM device is not already communicating with the host application 125, the master ATM device can indicate to the slave ATM device to forward the information, which the master ATM device can then forward to the entity's host application 125, which can determine the cost of parking from the parking ticket and confirm that the right amount of cash (or credit information) was received. The host application 125 can then send instructions back to the slave garage door opener device, by way of the master ATM device, indicating that the bar should be lifted and a receipt should be printed.

PDT Example

A PDT device can be a terminal that allows a user to make a deposit. For example, a cashier can have a PDT behind her in the store where she can make deposits of cash. In other embodiments, the PDT device can be accessible by the public, in case someone with a bank account wishes to make a deposit. In all of the above examples, a PDT device can be used instead of or in addition to the ATM device. For example, an entity could operate a host application 125, which can communicate with one master PDT device (or in some embodiments, more than one master PDT device). This master PDT device can in turn communicate over the CAN bus 120 with other slave devices. When a user enters a cash deposit in the slave PDT device, the slave PDT device can indicate to the master ATM device that it wishes to communicate this information to the host application through the CAN bus 120 so that the host application 125 can keep precise records of all money deposited into the PDT network. If the master PDT device is not already communicating with the host application 125, the master PDT device can indicate to the slave PDT device to forward the information, which the master PDT device can then forward to the host application 125, which can determine the amounts deposited into the different PDT devices and confirm that the right amount of cash (or credit information) was received and report this information to interested entities. The host application 125 can also send instructions back to the slave PDTs by-way of the master PDT device, such as information about which users are authorized to deposit in the PDT network.

A network utilizing PDT and/or ATM devices can be used, for example, in supermarket lanes, where many cashiers collect money. If the money is accounted for in the network, this money can be stored in secure boxes and credited even before the Cash in Transit company picks up this money.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

In addition, the terms "a", "an", "the", "said", etc. should be interpreted as "at least one", "the at least one", "said at least one", etc. throughout the application and claims.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A system for communicating, comprising:
   at least one master device comprising at least one central processing unit (CPU) comprising at least one master driver comprising at least one intelligent vending controller (IVC) application;
   at least one slave device comprising at least one slave driver; and
   at least one controller area network (CAN) bus facilitating communication between the at least one master device and the at least one slave device;
   the master device facilitating communication between at least one host application and the at least one master device and the at least one slave device such that the at least one slave device does not require the at least one IVC application in order to communicate with the host application;
   wherein the at least one master device and the at least one slave device are vendor devices;
   wherein the at least one master device and/or the at least one slave device are identified by serial numbers, and at least one record is kept of the at least one slave device that should be connected to the at least one master device; and
   wherein the at least one master driver and/or the at least one host computer is capable of determining when at least one new device attempts to connect to the at least one CAN bus.

2. The system of claim 1, wherein the at least one IVC application needs to be updated or changed only in the at least one master device, but the upgraded CPU affects the at least one slave device.

3. The system of claim 1, wherein the at least one master device and/or the at least one slave device comprise:
   at least one ATM;
   at least one garage door opener;
   at least one cash machine; or
   at least one point of deposit (PDT) device; or
   any combination thereof.

4. The system of claim 3, wherein at least one cash register determines when at least one pre-set amount of cash is in the at least one cash register, and the at least one cash register indicates that the at least one pre-set amount of cash should be moved to: the at least one ATM; the at least one cash machine; or the at least one PDT device; or any combination thereof.

5. The system of claim 4, wherein the at least one cash register is highly secure because it does not have more than the at least one pre-set amount of cash at any one time.

6. The system of claim 4, wherein costs for running the at least one ATM are reduced because the at least one ATM is continually replenished with cash from the at least one cash register.

7. The system of claim 1, wherein the system has a high level of security because the at least one IVC application of the at least one master driver is in at least one secure section of the at least one master device.

8. The system of claim 7, wherein the system has a high level of security because the at least one IVC application does not need to be present in the at least one slave device.

9. The system of claim 1, wherein the at least one master device and the at least one slave device are different types of devices.

10. The system of claim 1, wherein the at least one master device can communicate with any slave device that is located within approximately 1000 meters of the at least one master device.

11. The system of claim 1, wherein the at least one master driver and/or the at least one host computer is capable of determining when the at least one master device and/or the at least one slave device needs maintenance or replacement or security breach.

12. A method for communicating, comprising:
   communicating information between at least one host computer and at least one master device, the at least one master device comprising at least one master driver comprising at least one central processing unit (CPU) comprising at least one master driver comprising at least one intelligent vending controller (IVC) application; and
   communicating information between the at least one master device and at least one slave device, such that the at least one slave device does not require the at least one IVC application in order to communicate with the host computer;
   wherein the at least one master device and the at least one slave device are vendor devices;
   wherein the at least one master device and/or the at least one slave device are identified by serial numbers, and at least one record is kept of the at least one slave device that should be connected to the at least one master device; and
   wherein the at least one master driver and/or the at least one host computer is capable of determining when at least one new device attempts to connect to the at least one CAN bus.

13. The method of claim 12, wherein the at least one IVC application needs to be updated or changed only in the at least one master device, but the upgraded at least one IVC application affects the at least one slave device.

14. The method of claim 12, wherein the at least one master device and/or the at least one slave device comprise:
   at least one ATM;
   at least one garage door opener;
   at least one cash machine; or
   at least one point of deposit (PDT) device; or
   any combination thereof.

15. The method of claim 14, wherein at least one cash register determines when at least one pre-set amount of cash is in the at least one cash register, and the at least one cash register indicates that the at least one pre-set amount of cash should be moved to the at least one ATM.

16. The method of claim 15, wherein the at least one cash register is highly secure because it does not have more than the at least one pre-set amount of cash at any one time.

17. The method of claim 15, wherein costs for running the at least one ATM are reduced because the at least one ATM is continually replenished with cash from the at least one cash register.

18. The method of claim 12, wherein the at least one master device and the at least one slave device are different types of devices.

19. The method of claim 12, wherein the at least one master device can communicate with any slave device that is located within approximately 1000 meters of the at least one master device.

20. The method of claim 12, wherein the at least one master driver and/or the at least one host computer is capable of determining when the at least one master device and/or the at least one slave device needs maintenance or replacement.

21. The method of claim 12, wherein the system has a high level of security because the at least one PVC application of the at least one master driver is in at least one secure section of the at least one master device.

22. The method of claim 21, wherein the system has a high level of security because the at least one IVC application does not need to be present in the at least one slave device.

* * * * *